Feb. 14, 1933. O. KYLLO 1,897,263
INSECT DESTROYER
Filed Jan. 8, 1931 2 Sheets-Sheet 2

Inventor
O. Kyllo
By Clarence A. O'Brien
Attorney

Patented Feb. 14, 1933 1,897,263

UNITED STATES PATENT OFFICE

OLAF KYLLO, OF KETTLE FALLS, WASHINGTON

INSECT DESTROYER

Application filed January 8, 1931. Serial No. 507,467.

The present invention relates to an insect destroyer and has for its prime object to provide a structure of this nature which will attract the insects thereto and cause their electrocution.

Another very important object of the invention resides in the provision of an electric insect destroyer of this nature which is exceedingly simple in its construction, inexpensive to manufacture, thoroughly efficient and reliable in use and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

Figure 1:
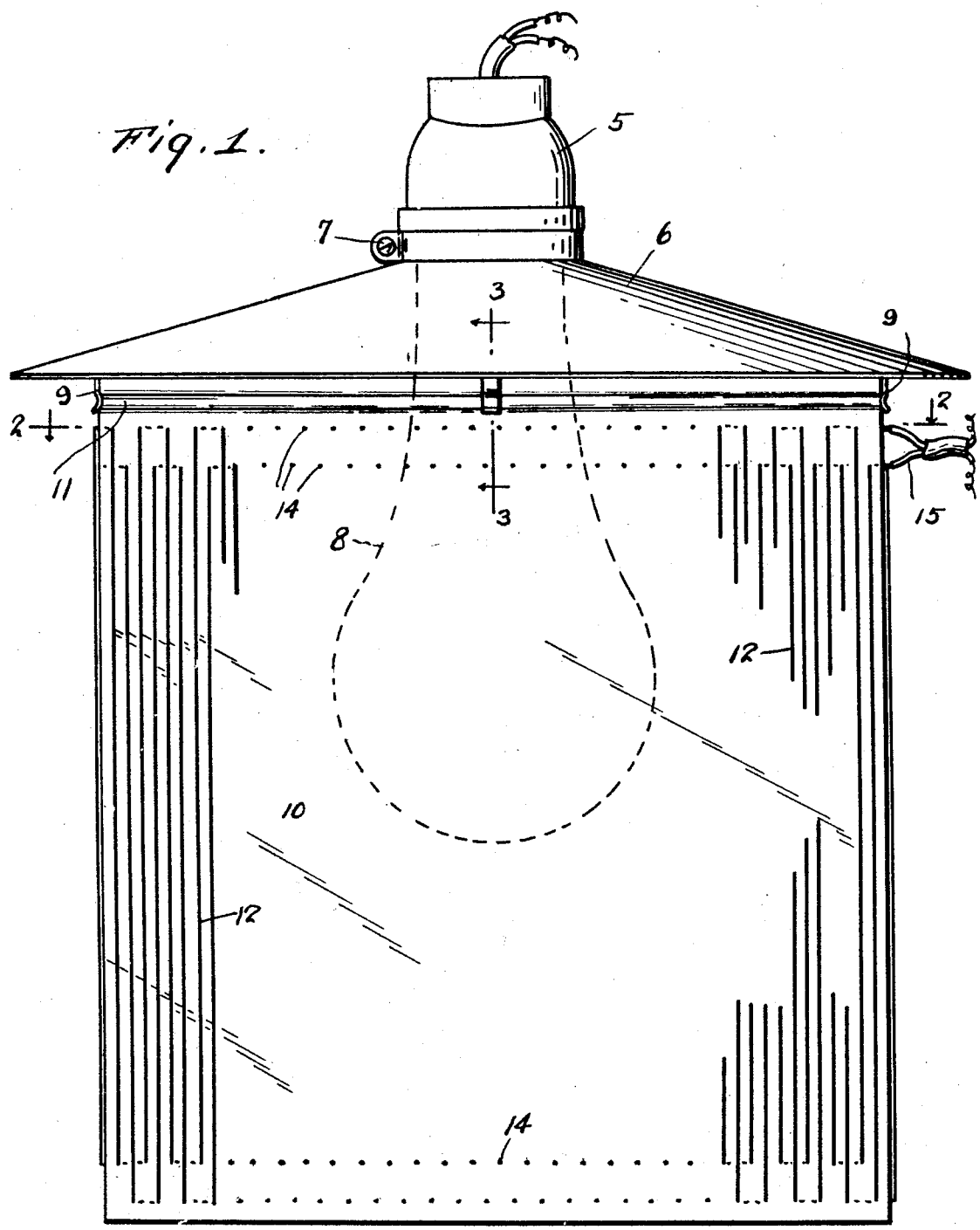
Figure 1 is a side elevation of a device embodying the features of my invention.
Figure 2:
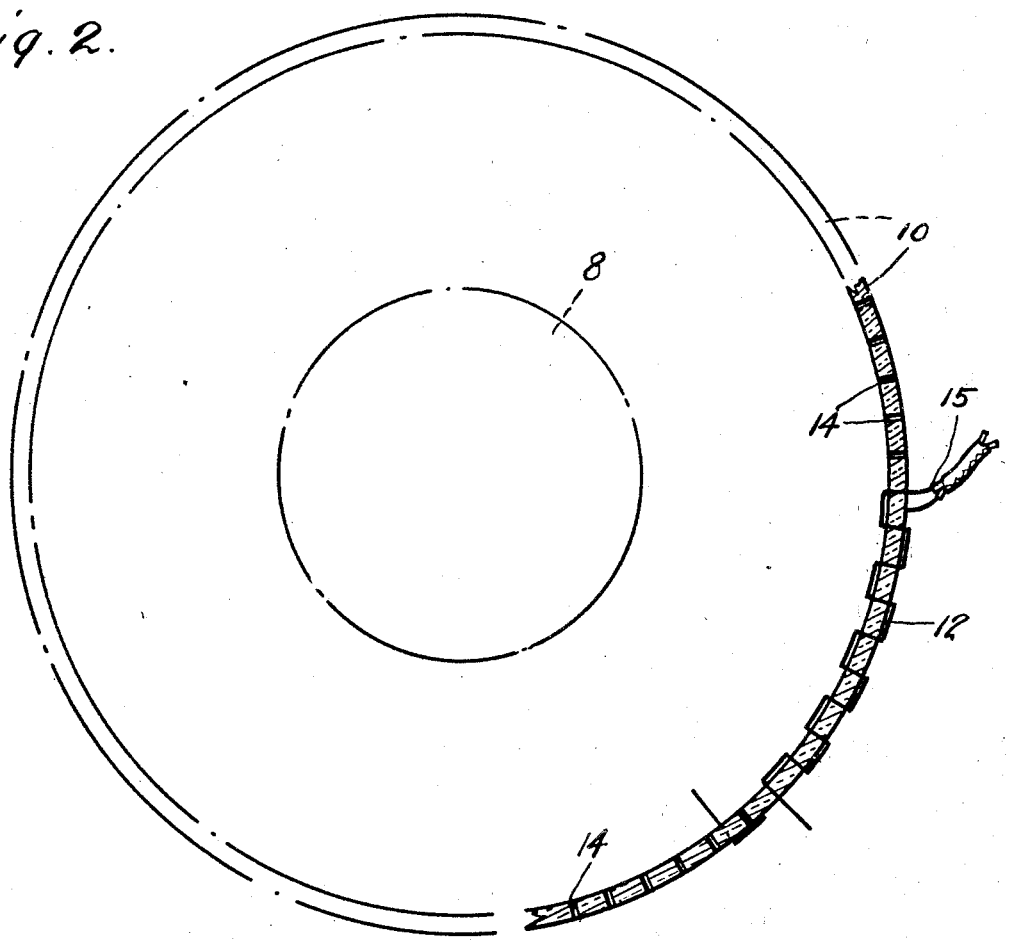
Figure 2 is a horizontal section taken substantially on the line 2—2 of Figure 1.
Figure 3:
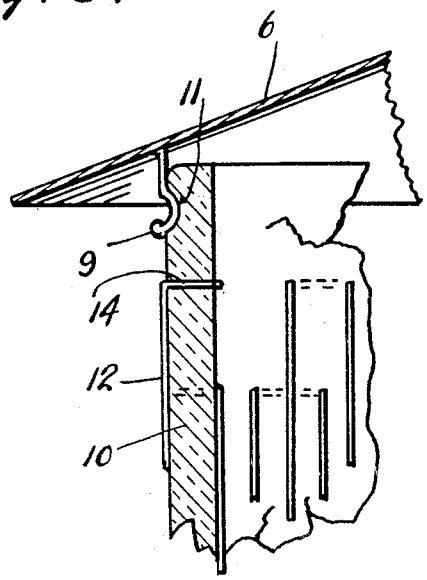
Figure 3 is a fragmentary vertical section taken substantially on the line 3—3 of Figure 1.
Figure 4:
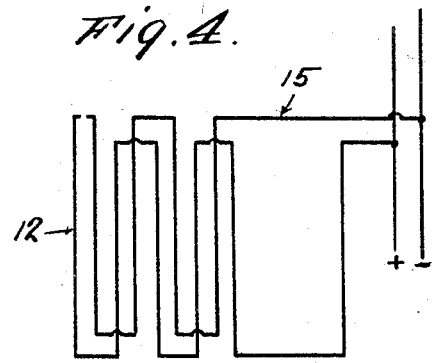
Figure 4 is a diagrammatic view of the wiring.

Referring to the drawings in detail it will be seen that the numeral 5 denotes an electric socket of suitable construction about which is disposed a shade by suitable clamping means 7 and from which depends a conventional electric light 8. Depending from the shade 6 are spring clips 9. The numeral 10 denotes a cylinder of translucent and insulating material and is formed adjacent its upper end on the outside with an annular groove 11 into which the spring clips 9 engage to suspend the cylinder 10 from the shade. A wire 12 extends up and down along the inside and outside of the cylinder 10 in straight parallel lines and portions of the wire, of course, extend through openings in the cylinder as is indicated at 14. This wire is connected by wiring 15 with a source of electrical energy so that the live exposed wire 12 will electrocute insects and the like which come into contact therewith when they fly toward the light 8. As will be seen from Figs. 1 and 4, the wires 12 are so connected with the wires 15 as to form positive and negative conductors with the negative conductors alternately arranged with the positive both on the interior and exterior walls of the cylinder 10. Thus insects contacting either the exterior or interior walls of the cylinder, will bridge the positive and negative conductors, so as to short circuit the wires and thus the insect will be killed.

This simple and inexpensive apparatus has been found particularly useful for destroying all orchard pests belonging to the moth family and thereby eliminates the necessity of spraying orchards. The apparatus has also been used to advantage in destroying the corn borer and obviously will be useful to destroy any other pests that originate from moths.

The apparatus, of course, may be used in many different ways and the above has merely been mentioned as an example. The present embodiment of the invention has been disclosed in considerable detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

1. An insect destroyer comprising a tubular member formed of non-conducting material and having holes therein adjacent its ends and position and negative electric wires vertically arranged in spaced relation on the inner and outer walls of the member with portions of the wires passing through the holes the positive and negative wires being alternately arranged.

2. An apparatus of the class described comprising a socket, a lamp therein, a shade mounted on the socket, a tubular member formed of translucent and non-conducting material and having an annular groove in its upper end, spring clips on the shade having parts engaging the groove to support the tubular member from the shade, said tubular member having transverse holes therein adjacent its upper and lower ends, positive and negative electric wires having portions extending vertically along the inner and outer walls of the tubular member with parts of the wires passing through the holes, said wires being alternately arranged on the tubular member, and means for connecting the wires to a source of electrical supply.

In testimony whereof I affix my signature.

OLAF KYLLO.